United States Patent [19]

Naramura

[11] Patent Number: 5,546,848
[45] Date of Patent: Aug. 20, 1996

[54] SANDWICH PREPARATION APPARATUS

[75] Inventor: Michiyuki Naramura, Okayama-ken, Japan

[73] Assignee: Kabushiki Kaisha Kyowa Kogyosho, Okayama-ken, Japan

[21] Appl. No.: 411,349

[22] Filed: Mar. 27, 1995

[30] Foreign Application Priority Data

Mar. 25, 1994 [JP] Japan .................................. 6-055335
Sep. 9, 1994 [JP] Japan .................................. 6-215494

[51] Int. Cl.$^6$ .............................. A21C 9/04; B32B 31/04; A21D 13/08; A23L 1/31
[52] U.S. Cl. ................................. 99/326; 99/355; 99/357; 99/387; 99/423; 99/443 C; 99/450.4
[58] Field of Search .............. 99/325, 326, 450.1–450.5, 99/334, 352, 355, 357, 443 R, 443 C, 494, 386; 426/274, 275; 219/388; 221/150 A, 150 R

[56] References Cited

U.S. PATENT DOCUMENTS 4,685,387  8/1987  Hanson et al. .................... 99/450.1
5,101,716  4/1992  Cones, Sr. et al. ................. 99/450.5
5,113,753  5/1992  Robinson ........................... 99/326
5,113,754  5/1992  Robinson et al. .................. 99/450.4
5,365,835  11/1994 Naramura ........................... 99/357

*Primary Examiner*—Timothy F. Simone
*Attorney, Agent, or Firm*—Christopher R. Pastel; Thomas R. Morrison

[57] ABSTRACT

A sandwich preparation apparatus includes a plurality of sandwich production lines disposed parallel to each other. A width of each line is slightly wider than a width of a sandwich prepared in the apparatus. Each sandwich production line includes an automatic heel toasting device, an automatic patty grilling device, and an automatic crown toasting device. A heel stocker, a patty stocker, and a crown stocker are optionally included in the apparatus. A heel adding section, a patty adding section, and a crown adding section are optionally included in the apparatus. A manual preparation section is optionally included for enabling an operator manually to add additional required food materials to the sandwich. This apparatus produces a variety of sandwiches and hamburgers and is compact enough to fit in a relatively small kitchen.

13 Claims, 18 Drawing Sheets

SANDWICH PREPARATION APPARATUS

BACKGROUND OF THE INVENTION

The present invention relates to a sandwich preparation apparatus. More particularly, the present invention relates to a sandwich preparation apparatus which incorporates a plurality of production lines for producing sandwiches such as, for example, hamburgers.

Conventional hamburgers include one or more meat patties in a bun along with various condiments and sauces. A variety of other types of hamburgers and sandwiches have recently become popular and are in high demand at food outlets. These include, for example, such items as teriyaki burgers (adding teriyaki sauce to a conventional hamburger), bacon and lettuce burgers, cheeseburgers, fish sandwiches, chicken sandwiches, and croquette sandwiches. New types and kinds of hamburgers and sandwiches are being introduced regularly. The words "hamburger" and "sandwich" are interchangeably used hereafter unless otherwise specified.

A demand for increased productivity has arisen as a result of an increase in the number of consumers and increasingly diversified tastes. However, preparation of hamburgers has been primarily manually performed in conventional kitchen facilities which consist of a freezer for meat patties, a refrigerator for condiments and sauces, a broiler or grill for cooking, a toaster for buns, a deep fat fryer, and a work table for manually assembling food materials onto a bun to complete the ordered sandwich. Each of these areas is independent of the others. Productivity of kitchen facilities has steadily improved, and now has reached a limit.

In order to solve the problems mentioned above, an automatic hamburger fixing apparatus has been developed. For example, the apparatus disclosed in Japanese Patent Application Laid-Open No. 1-91739 attempts to overcome the productivity problems inherent in conventional manual systems. However, this apparatus is designed to prepare only limited kinds of sandwiches.

In order to prepare all of the kinds of sandwiches listed above, an apparatus must have feeding and adding mechanisms for each and every type of food materials necessary for producing sandwiches. This requirement makes the apparatus bigger and requires a large space for installation. In addition, every time a new type of hamburger or sandwich is introduced, another mechanism for feeding the new food material must be incorporated into the existing apparatus. The control system also must be modified accordingly. It is impossible to install such an apparatus in a relatively small conventional kitchen, and it is difficult to install additional mechanisms and modifications to the control system when introducing new items to the menu.

OBJECTS AND SUMMARY OF THE INVENTION

Accordingly, it is an object of the invention to provide a hamburger preparation apparatus which overcomes the drawbacks and limitations of the prior art.

It is another object of the invention to provide a hamburger preparation apparatus which is capable of automatically preparing a variety of hamburgers and sandwiches.

It is another object of the present invention to provide a hamburger preparation apparatus which is relatively small and easily installed in a conventional kitchen.

It is another object of the present invention to provide a hamburger preparation apparatus which increases the productivity and efficiency of a commercial kitchen.

Briefly stated, a sandwich preparation apparatus includes a plurality of sandwich production lines disposed parallel to each other. A width of each line is slightly wider than a width of a sandwich prepared in the apparatus. Each sandwich production line includes an automatic heel toasting device, an automatic patty grilling device, and an automatic crown toasting device. A heel stocker, a patty stocker, and a crown stocker are optionally included in the apparatus. A heel adding section, a patty adding section, and a crown adding section are optionally included in the apparatus. A manual preparation section is optionally included for enabling an operator manually to add additional required food materials to the sandwich. This apparatus produces a variety of sandwiches and hamburgers and fits in a relatively small kitchen.

According to an embodiment of the invention, a sandwich preparation apparatus includes at least one sandwich production line, each sandwich production line including means for producing a sandwich, the sandwich including at least a heel, a crown, and an item therebetween, the sandwich production lines having a width slightly greater than a width of the sandwich, and the sandwich production lines having means for toasting the heel, means for toasting the crown, and means for adding the item to complete the sandwich.

According to a feature of the invention, the sandwich preparation apparatus further includes means for grilling the item.

According to a feature of the invention, the sandwich preparation apparatus includes means for manually adding a food material to the sandwich.

According to an embodiment of the invention, a sandwich preparation apparatus includes at least one sandwich production line, the at least one sandwich production line effective for preparing at least one type of sandwich, the at least one sandwich production line including a conveyor belt, a conveying dish supply device for feeding a conveying dish onto the conveyor belt, a heel stocker for stocking an untoasted heel, a heel toasting device for toasting the untoasted heel, thereby producing a toasted heel, a heel pusher for moving the untoaster heel from the heel stocker to the heel toasting device, means for moving the toasted heel to the conveying dish, a patty stocker for stocking an uncooked patty, a patty grilling device for grilling the uncooked patty, thereby producing a grilled patty, a roller conveyor extending from the patty stocker to the patty grilling device, an arm for moving the uncooked patty from the patty stocker to the roller conveyor, means for moving the grilled patty to a patty holding area, means for moving the grilled patty from the patty holding area to the toasted heel on the conveying dish, a crown stocker for stocking an untoasted crown, a crown toasting device for toasting the untoaster crown, thereby producing a toasted crown, an upper heating plate of the crown toasting device having a recessed portion substantially conforming to a shape of an upper side of the crown, a crown pusher for moving the untoasted crown from the crown stocker to the crown toasting device, means for moving the toasted crown onto the grilled patty on the toasted heel on the conveying dish, an interface board, a CPU, at least one key on the interface board acting as an input to the CPU, the at least one key corresponding to the at least one type of sandwich, and means, responsive to the input, whereby the CPU controls at least one of the conveying dish supply device, the heel stocker, the heel pusher, the heel toasting device, the means for moving the toasted heel to the conveying dish, the patty stocker, the arm, the patty grilling device, the means for moving the grilled patty to the patty holding area, the means for moving the grilled patty from the patty holding area to the toasted heel on the conveying dish, the crown stocker, the crown pusher, the crown toasting device, and the means for moving the toasted crown onto the grilled patty on the toasted heel on the conveying dish.

According to an embodiment of the invention, a sandwich preparation apparatus includes at least one sandwich production line, the at least one sandwich production line effective for preparing at least one type of sandwich, the at least one sandwich production line including a conveyor belt, a conveying dish supply device for feeding a conveying dish onto the conveyor belt, a heel toasting device for toasting an untoasted heel, thereby producing a toasted heel, means for manually adding the untoasted heel to the heel toasting device, means for moving the toasted heel to the conveying dish, a patty grilling device for grilling an uncooked patty, thereby producing a grilled patty, means for manually adding the uncooked patty to the patty grilling device, means for moving the grilled patty to a patty holding area, means for moving the grilled patty from the patty holding area to the toasted heel on the conveying dish, a crown toasting device for toasting an untoasted crown, thereby producing a toasted crown, an upper heating plate of the crown toasting device having a recessed portion substantially conforming to a shape of an upper side of the crown, means for manually adding the untoasted crown to the crown toasting device, means for moving the toasted crown onto the grilled patty on the toasted heel on the conveying dish, an interface board, a CPU, at least one key on the interface board acting as an input to the CPU, the at least one key corresponding to the at least one type of sandwich, and means, responsive to the input, whereby the CPU controls at least one of the conveying dish supply device, the heel toasting device, the means for moving the toasted heel to the conveying dish, the patty grilling device, the means for moving the grilled patty to the patty holding area, the means for moving the grilled patty from the patty holding area to the toasted heel on the conveying dish, the crown toasting device, and the means for moving the toasted crown onto the grilled patty on the toasted heel on the conveying dish.

The present invention has the following advantages.

(A) Production of a variety of hamburgers and sandwiches.

In the apparatus according to the present invention, crowns and heels (which are always essential for sandwiches), and patties (which are essential depending on the ordered sandwich), are toasted or heated by the corresponding automatic heating sections. An operator stays at a manual preparation section and prepares a wide variety of hamburgers and sandwiches, merely by placing necessary food materials onto heels. Crowns and patties are placed onto heels by a superimposing mechanism. Alternatively, the operator can add patties and crowns to the sandwich manually.

(B) Installability in a conventional, relatively small kitchen.

A regular hamburger or sandwich bun has a diameter of about 10 cm, thereby permitting a width of each sandwich production line to be about 15 cm. Accordingly, a number of parallel adjacent sandwich production lines do not require a great width. As described in section (A) above, a variety of sandwiches can prepared in a single system. One single compact size apparatus, which can be installed in a conventional, relatively small kitchen, can produce a variety of hamburgers and sandwiches.

(C) Heightened productivity.

Toasting crowns and heels, and grilling patties, which are cumbersome operations, can be automatically done by corresponding automatic sections on each production line. One apparatus therefore has great capability for toasting buns and grilling patties. The operator does not have to wait for heels, patties, or crowns to be ready, thereby resulting in increased productivity.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
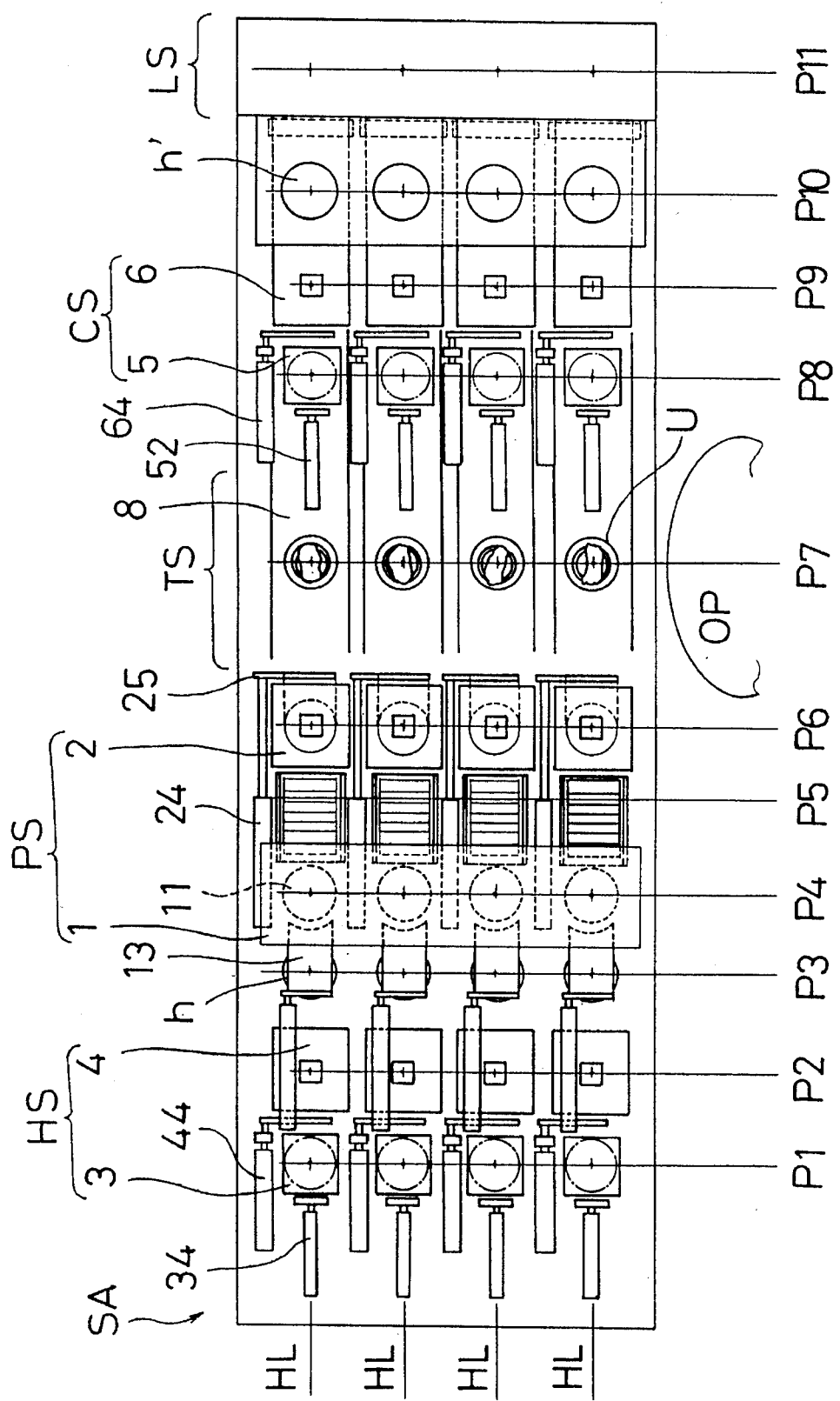
FIG. 1 is a plan view of an embodiment of a sandwich preparation apparatus according to the present invention.
Figure 2:
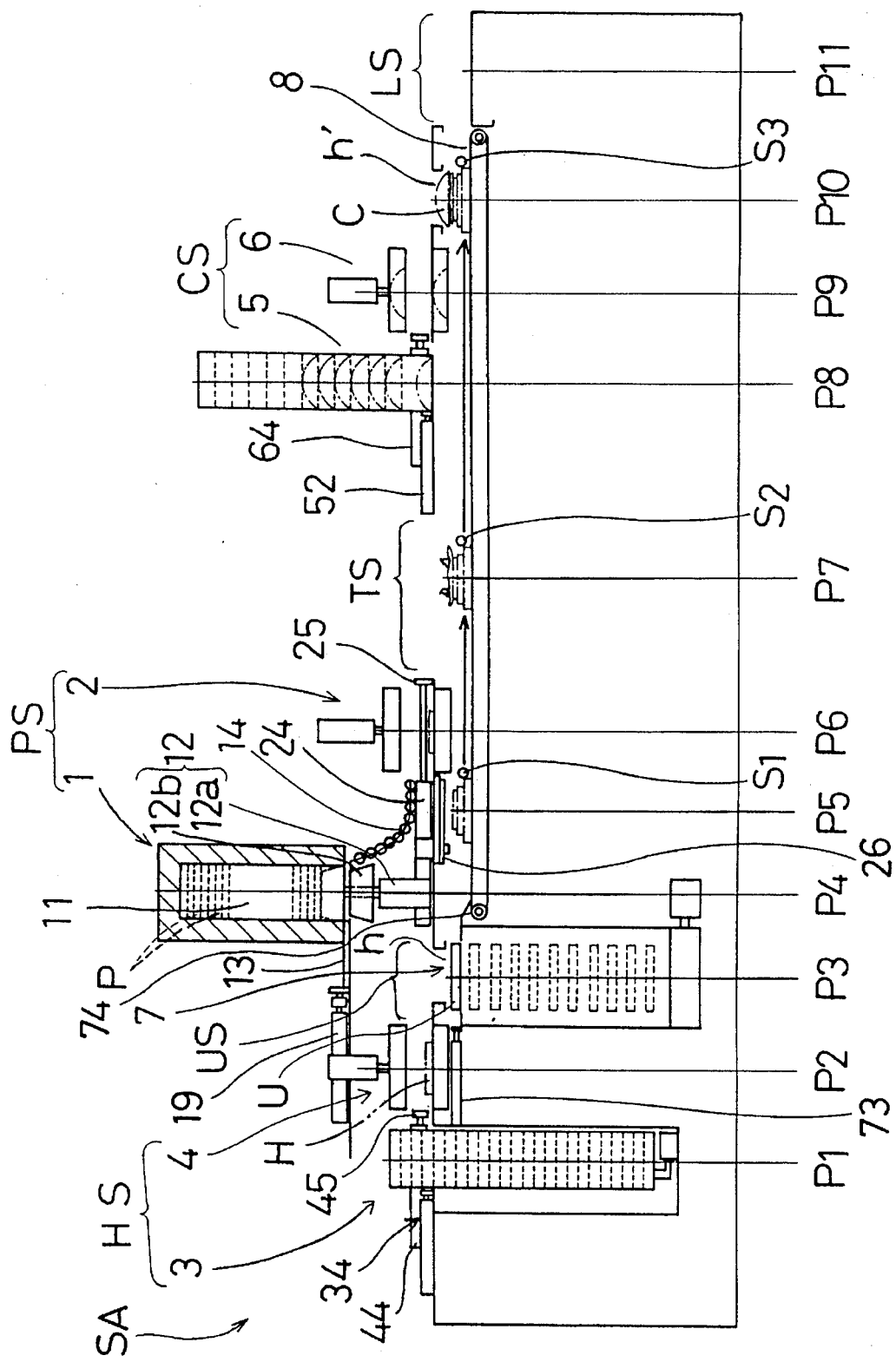
FIG. 2 is a front view of the sandwich preparation apparatus of FIG. 1.

Referring to FIGS. 1 and 2, a sandwich preparation apparatus SA includes four straight sandwich production lines HL. Each sandwich production line HL runs from a position P1 toward a position P11. An "upstream side" is to the left in FIG. 1, and a "downstream side" is to the right.

Each sandwich production line HL includes, in order from upstream to downstream, an automatic heel preparation section HS, a conveying dish supply section US, an automatic patty preparation section PS, a manual preparation section TS, an automatic crown preparation section CS, and a wrapping section LS. A conveyor belt 8 extends from conveying dish supply section US to wrapping section LS. Each section is described in detail below.

Automatic heel preparation section HS

Automatic heel preparation section HS discharges a plurality of heels H from a heel stocker 3 one by one and toasts these heels H sequentially in a heel toasting device 4.

Figure 3:
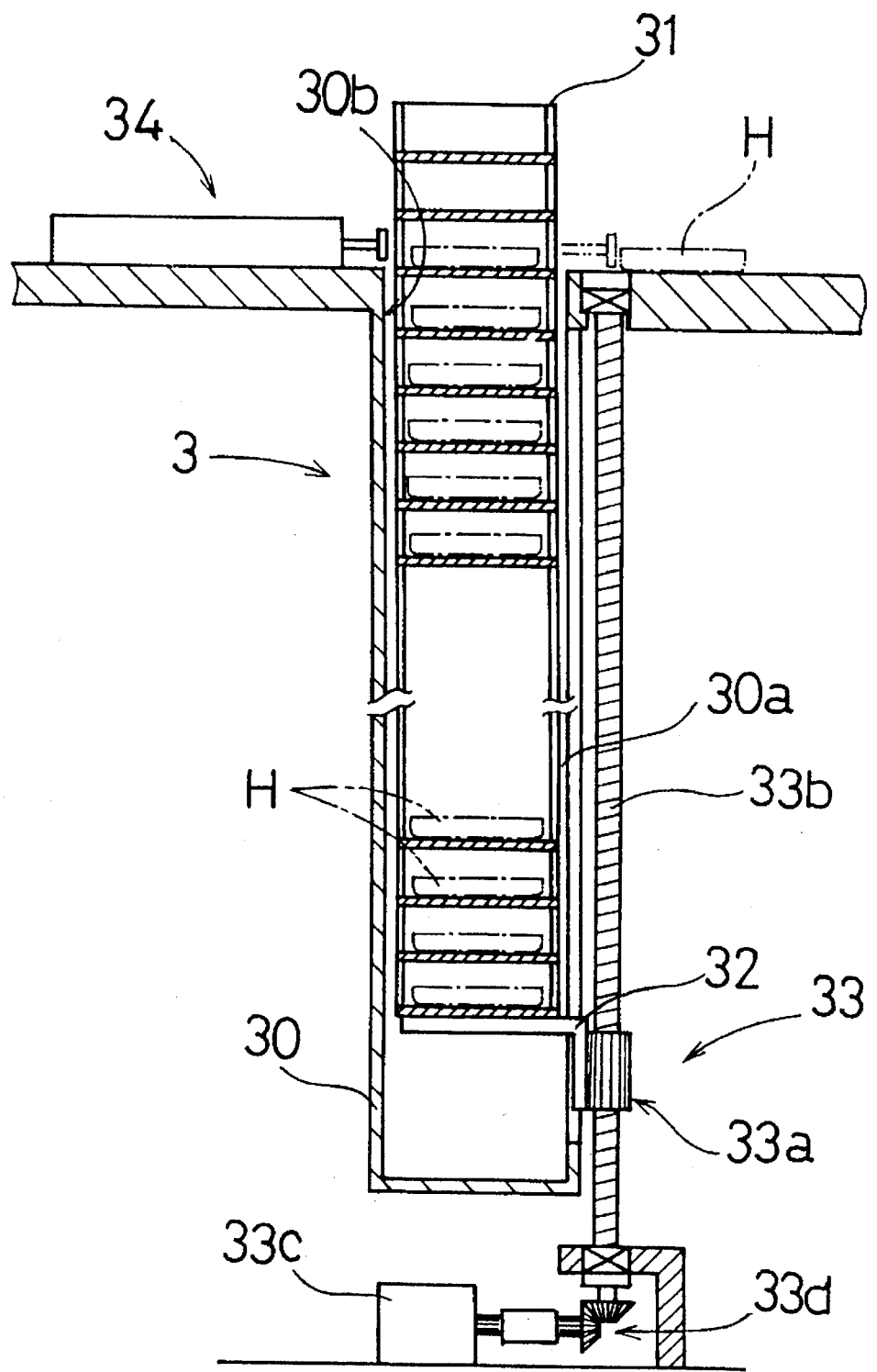
FIG. 3 is a section view of a heel stocker of the sandwich preparation apparatus of FIG. 1.

Referring also to FIG. 3, heel stocker 3 includes a substantially rectangular parallelepiped box 30 which receives a magazine 31 therein. Box 30 has an interior vertical slit 30a for permitting an arm 32 to move vertically up and down the length of box 30. A lifting means 33 lifts arm 32 along vertical slit 30a, thereby allowing magazine 31 to project from an upper hole 30b of heel stocker 3.

Figure 4:
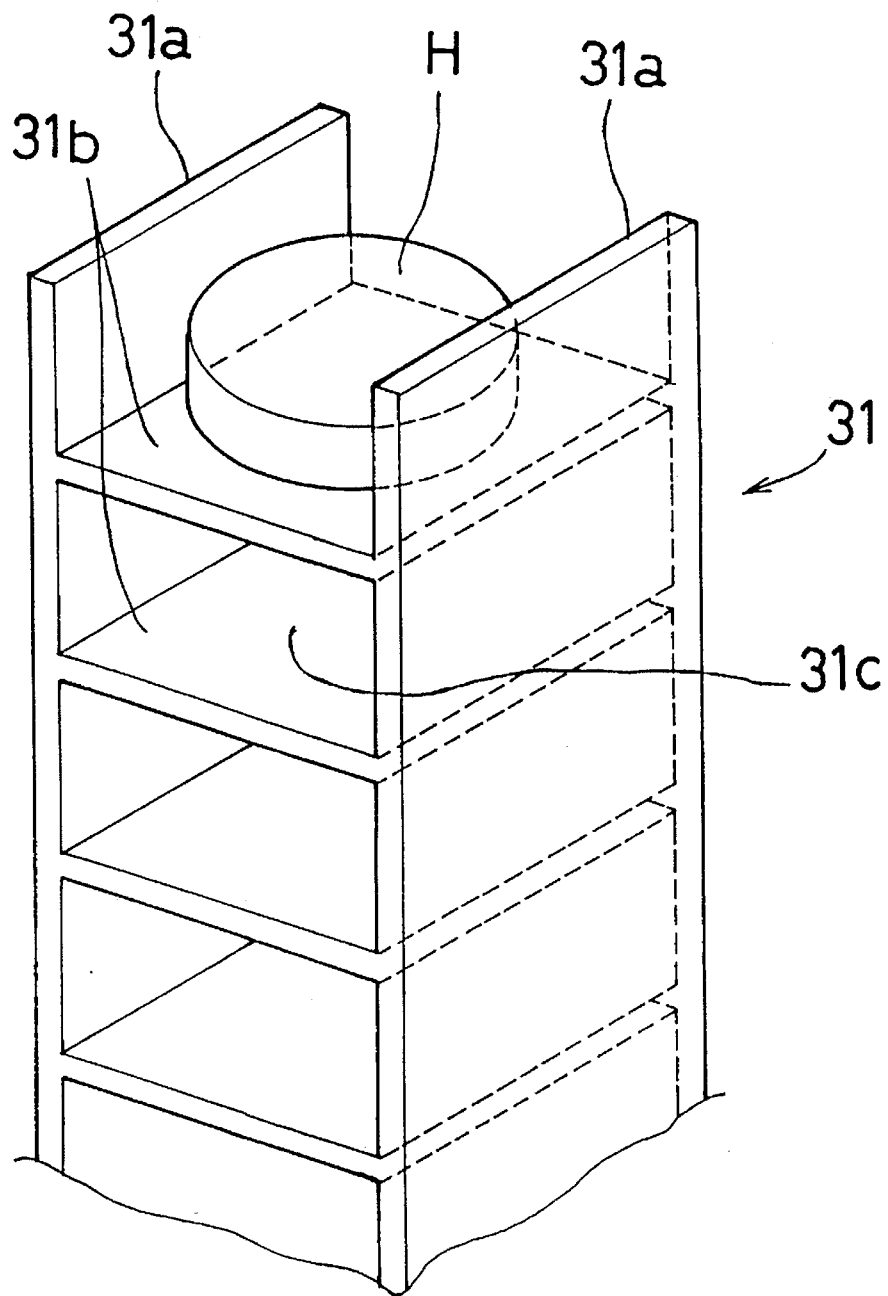
FIG. 4 is a perspective view of a heel magazine which fits into the heel stocker of FIG. 3.

Referring also to FIG. 4, magazine 31 includes a pair of vertical plates 31a and a plurality of horizontal plates 31b which are affixed to the pair of vertical plates 31a at predetermined intervals. Vertical plates 31a and pairs of adjacent horizontal plates 31b define heel receiving spaces 31c which are open on the front and back while being closed on the sides. As shown in FIG. 3, heel H is pushed out from space 31c by a pusher 34, which is driven by a cylinder (not shown).

Lifting means 33 includes a lifting member 33a with a ball-screw unit. Arm 32 is secured to lifting member 33a. A male screw 33b of the ball-screw unit is rotated via a gear 33d by a motor 33c. Lifting movement of magazine 31 stops when a top face of one of horizontal plates 31b is aligned with a top face of heel stocker 3. Any conventional sensing means, such as a mechanical feeler, or a light sensor (neither of which is shown), is used to detect this alignment. When this alignment occurs, pusher 34 is actuated to push heel H from a position P1 at the top face of horizontal plate 31b to a position P2 in heel toasting device 4.

Figure 5:
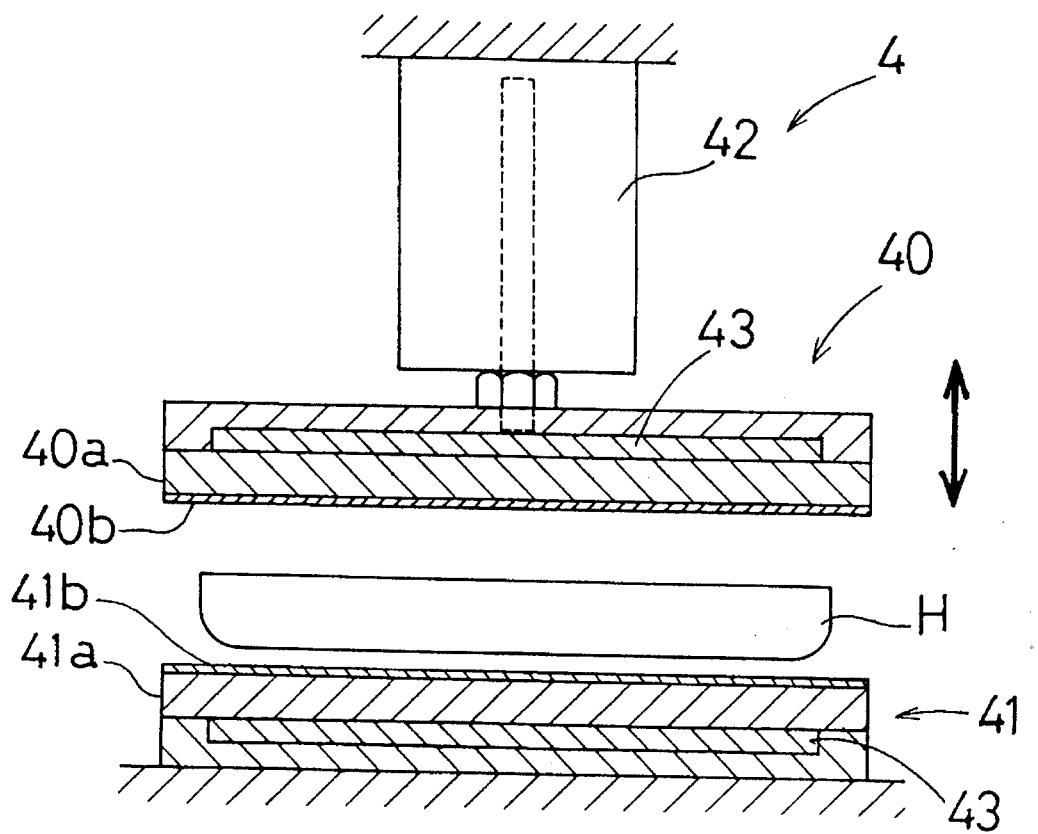
FIG. 5 is a partial section view of a heel toasting device according to the present invention.

Referring to FIG. 5, heel toasting device 4 toasts heel H by heating it while pressing it between a pair of substantially parallel upper and lower heating plates 40, 41 disposed one above the other. Upper heating plate 40 is moved by a cylinder 42 into contact with the upper surface of heel H. Heating plates 40, 41 each include upper and lower metal plates with a heater 43 inserted therebetween. A pressing face 40a of upper heating plate 40 is opposite a pressing face 41a of lower heating plate 41. Pressing faces 40a, 41a are preferably flat.

Pressing face 41a has a layer 41b on its upper surface. Layer 41b is a far infrared radiation substance such as alumina $Al_2O_3$. Pressing face 40a has a layer 40b on its lower surface facing pressing plate 41a. Since pressing face 40a contacts a cut side of heel H, it is particularly advisable that layer 40b be a combination of the far infrared radiation substance and a non-stick material such as, for example, silicon or a polytetrafluoroethylene (PTFE) such as is sold under the registered trademark "TEFLON." Layer 40b exerts a surface activating effect.

There are various ways to coat pressing face 40a with layer 40b. Initially, the far infrared radiation substance is sprayed onto the surface of pressing face 40a. A silicon coating 50 μm to 100 μm thick is then applied thereto. Finally, a PTFE coating that is several microns thick is applied to the silicon coating. Another method is to coat the surface of pressing face 40a with a surface activating substance, such as a mixture of powdered far infrared radiation substance and silicon or PTFE. Accordingly, when using heel toasting device 4 of the present invention, a high thermal effect of the far infrared radiation substance is achieved along with the adherence effects of the PTFE.

Referring back to FIGS. 1–2, heels H toasted by heel toasting device 4 are moved from position P2 to a position P3 by a pusher 44 driven by a torque actuator on an output shaft of a cylinder (not shown).

Conveying dish supply section US

Referring to FIG. 2, conveying dish supply section US is shaped as a substantially rectangular parallelepiped for receiving a conveying dish supply device 7. Conveying dish supply device 7 carries a plurality of conveying dishes U sequentially to a position just below a heel receiving port h at position P3.

Figure 6:
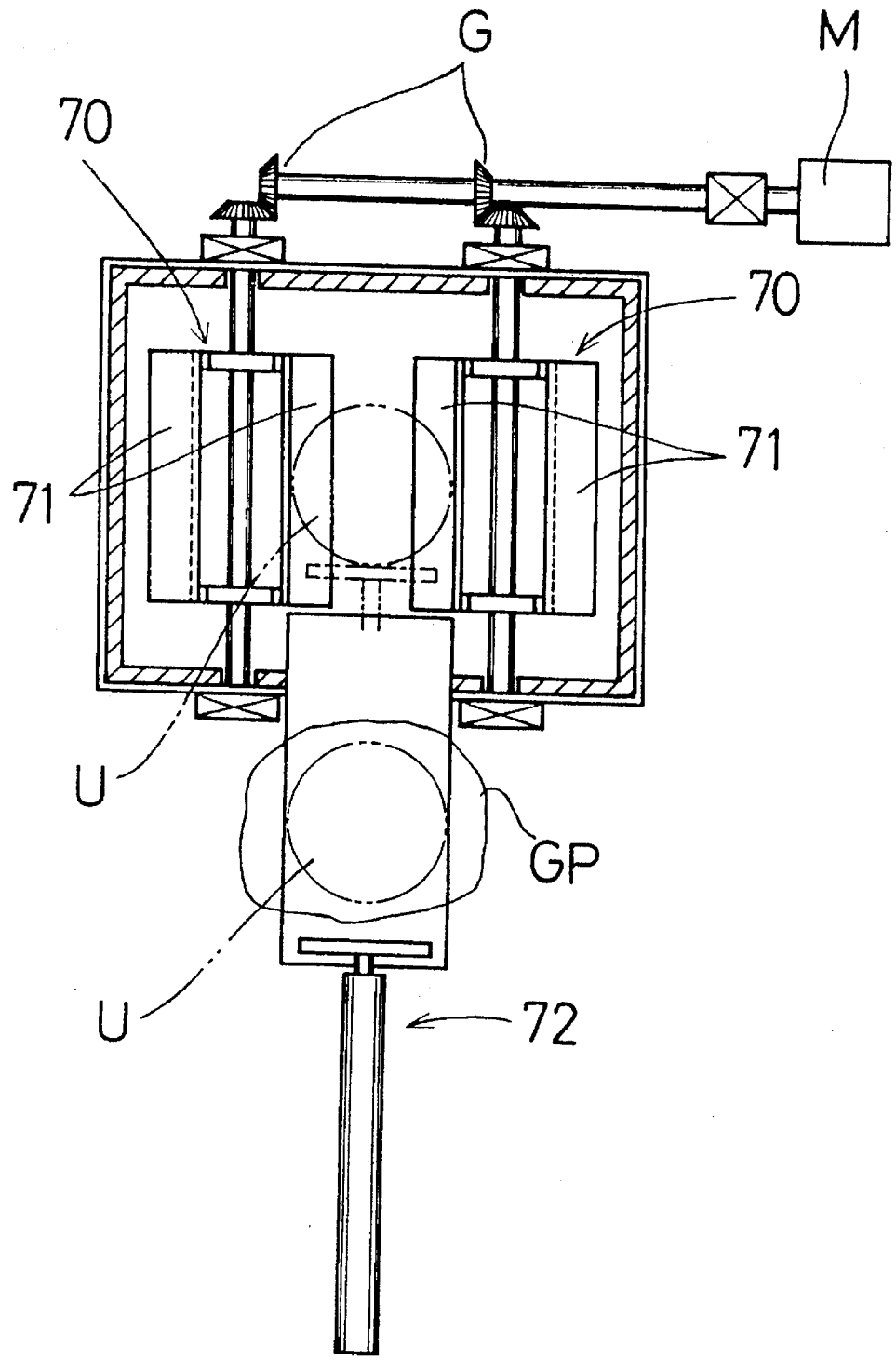
FIG. 6 is a section view of a lower portion of a conveying dish supply device according to the present invention.
Figure 7:
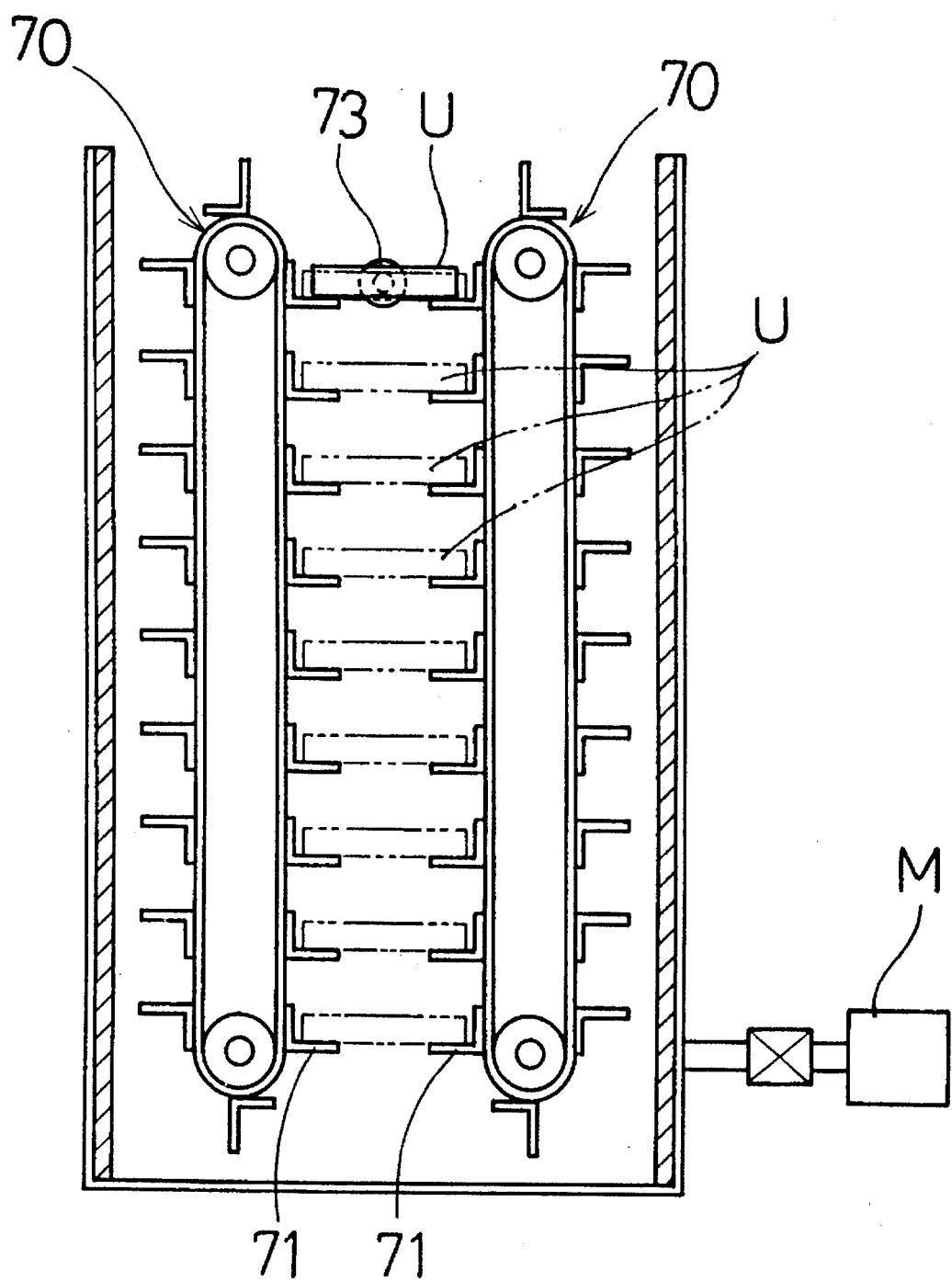
FIG. 7 is a section view of a side portion of the conveying dish supply device of FIG. 6.
Figure 8:
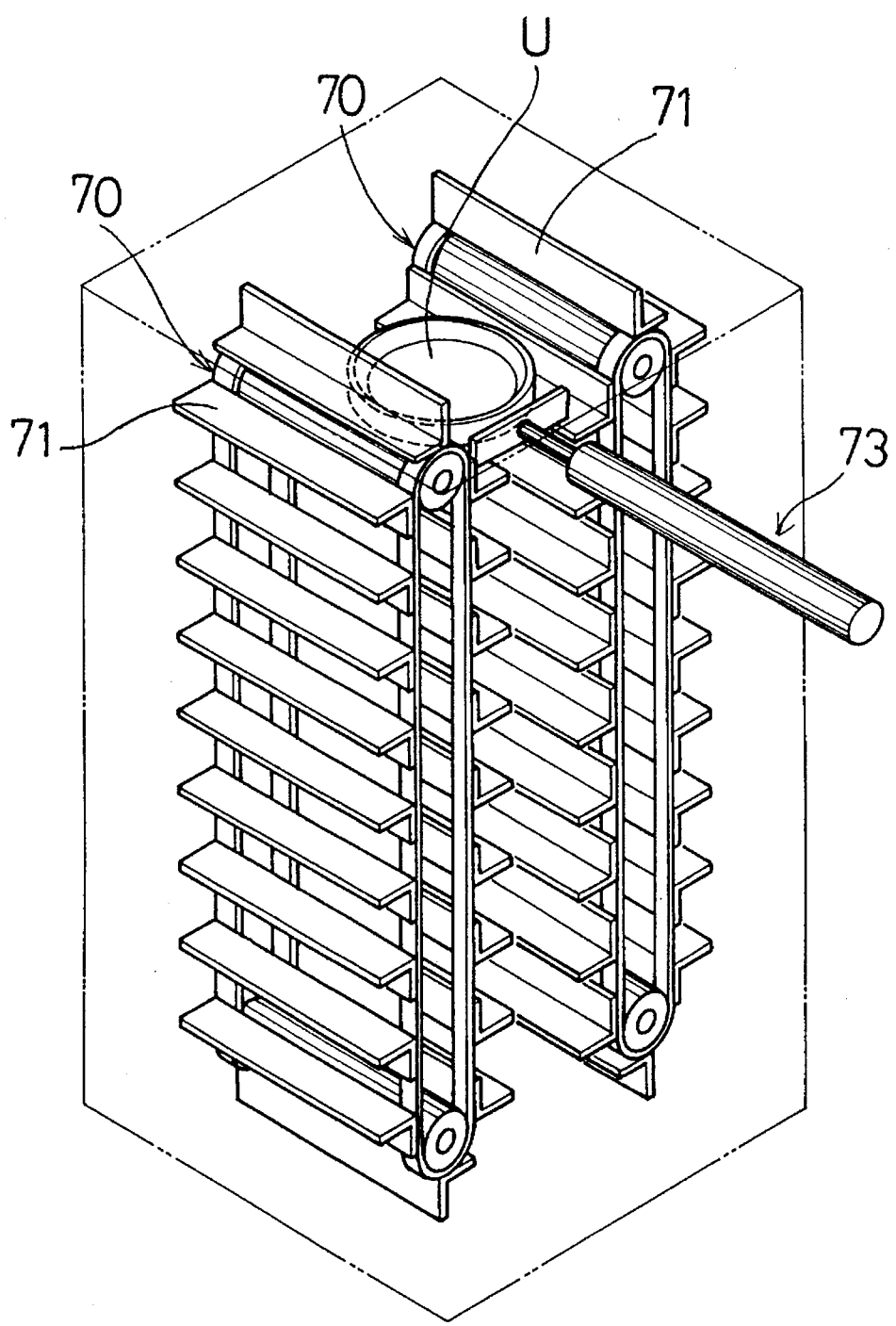
FIG. 8 is a perspective view of the conveying dish supply device of FIG. 6.

Referring to FIGS. 6–8, conveying dish supply device 7 includes a pair of looped belt units 70 that are rotated synchronously by a motor M through a gear G. Each looped belt unit 70 has an equal number of L-shaped dish receiving members 71 that are similarly spaced on each looped belt unit 70. As the pair of looped belt units 70 move, pairs of dish receiving members 71, one on each belt unit 70, oppose each other and cooperate to receive one conveying dish U and lift it to just below heel receiving port h. As shown in FIG. 6, a pusher 72 near a side bottom portion of conveying dish supply device 7 pushes conveying dish U from a position GP onto a pair of dish receiving members 71. As shown in FIGS. 7 and 8, a pusher 73 near a top portion of conveying dish supply device 7 pushes conveying dish U from the pair of dish receiving members 71 onto conveyor belt 8 via a chute 74.

Pusher 73 is actuated to push conveying dish U onto chute 74 and conveyor belt 8 just after a toasted heel H falls through heel receiving port h. Any conventional sensing means, such as a light sensor, detects a presence of heel H on conveying dish U and actuates pusher 73 accordingly. Conveying dish U is carried downstream to a position P5 where it is stopped by a stopper S1.

Conveyor belt 8

Referring to FIG. 2, conveyor belt 8 includes a pair of rollers 80, 80. A looped belt is reeved between the pair of rollers 80, 80 and runs continuously. Conveying dish U with an uncompleted sandwich thereon moves downstream to stations where it is stopped at position P5 by stopper S1, at a position P7 by a stopper S2, and at a position P10 by a stopper S3. Conveyor belt 8 continues to slide underneath conveying dish U while conveying dish U is stopped at these various positions.

Automatic patty preparation section PS

Referring to FIGS. 1 and 2, automatic patty preparation section PS discharges a plurality of patties P sequentially from a patty stocker 1. A patty grilling device 2 grills these patties P for addition to an uncompleted sandwich. Patty stocker 1 is substantially rectangularly parallelepiped in shape and bridges all four sandwich production lines HL. Patty stocker 1 includes four cylindrical freezing chambers 11, one above each of the four sandwich production lines HL. Patties P are stacked in four freezing chambers 11. Each stack within each freezing chamber 11 is supported by a lifting unit 12.

Lifting unit 12 includes a cylinder 12a and a stopper 12b. Stopper 12a is attached to an end of an output shaft of cylinder 12a so as to be vertically movable. When discharging one patty P, stopper 12b lowers to a position where a single bottom patty P of the stack of patties P in freezing chamber 11 drops below a bottom surface of patty stocker 1. After patty P is discharged, stopper 12b returns to its original raised position, thereby covering the bottom surface of patty stocker 1. This facilitates keeping a proper temperature inside freezing chamber 11.

Patty stocker 1 includes an arm 13 driven by conventional means, such as a cylinder 19, for pushing bottom patty P from patty stocker 1 while stopper 12b is in its lowered position. Patty P then moves smoothly from a position P4 onto a roller conveyor 14 where it moves to grilling device 2 at a position P6.

Figure 11:
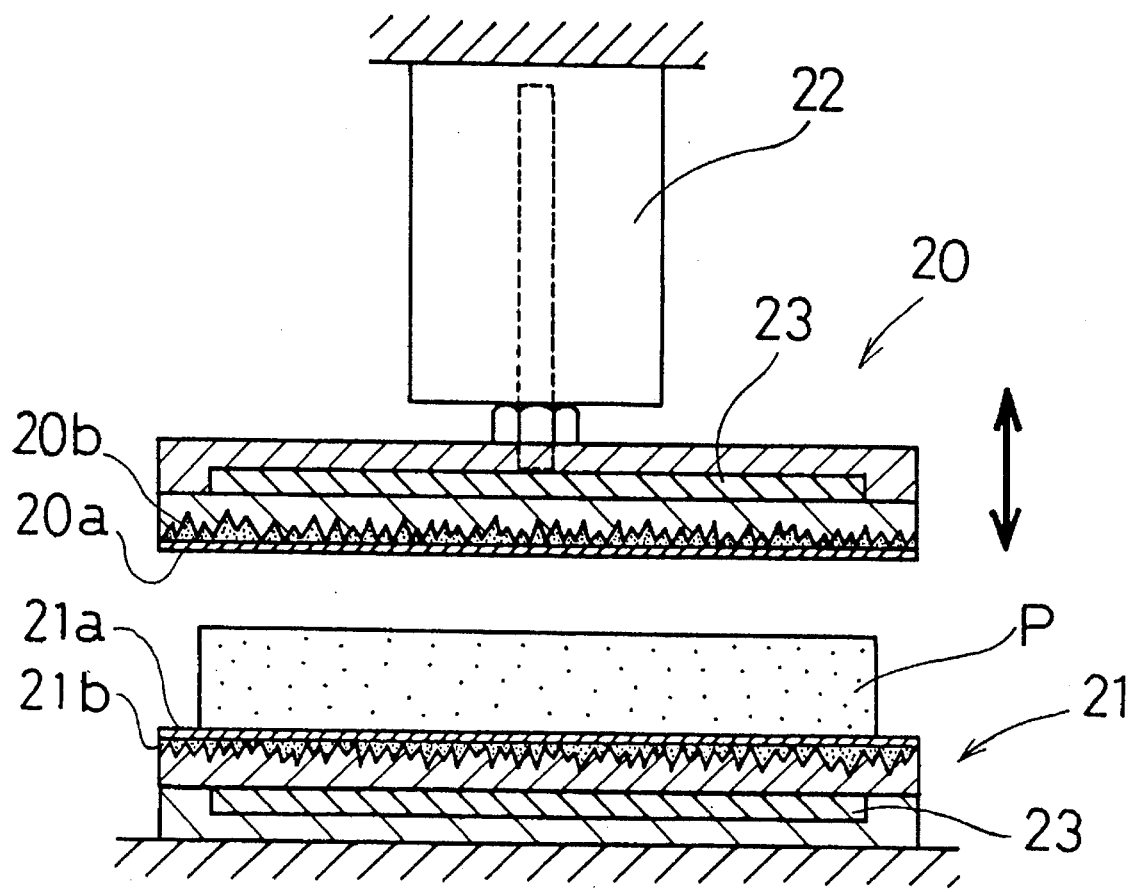
FIG. 11 is a partial section view of a patty grilling device of the sandwich preparation apparatus according to the present invention.

Referring to FIGS. 1, 2, and 11, four patty grilling devices 2 are disposed on the four sandwich production lines HL for receiving patties P from each freezing chamber 11. Patty P is pressed and grilled between a pair of upper and lower grilling plates 20,21. Upper grilling plate 20 is actuated by a cylinder 22 while lower grilling plate 21 remains stationary. Upper and lower grilling plates 20, 21 each include upper and lower metal plates with a heater 23 sandwiched therebetween. Pressing surfaces 20a, 21a of upper and lower grilling plates 20, 21 each include a layer 20b, 21b which is similar to layer 40b previously described in FIG. 5. That is, layers 20b, 21b are of a far infrared radiation substance and a silicon or PTFE. Patty P, after being grilled by patty grilling device 2, is shifted (pushed) from position P6 onto a patty receiver 26 at position P5 by an arm 25 affixed to an end of a cylinder 24. The direction of movement of patty P is opposite to the direction of the other flows discussed in the above, in order to move patty P onto patty receiver 26 aligned over position P5.

Figure 12:
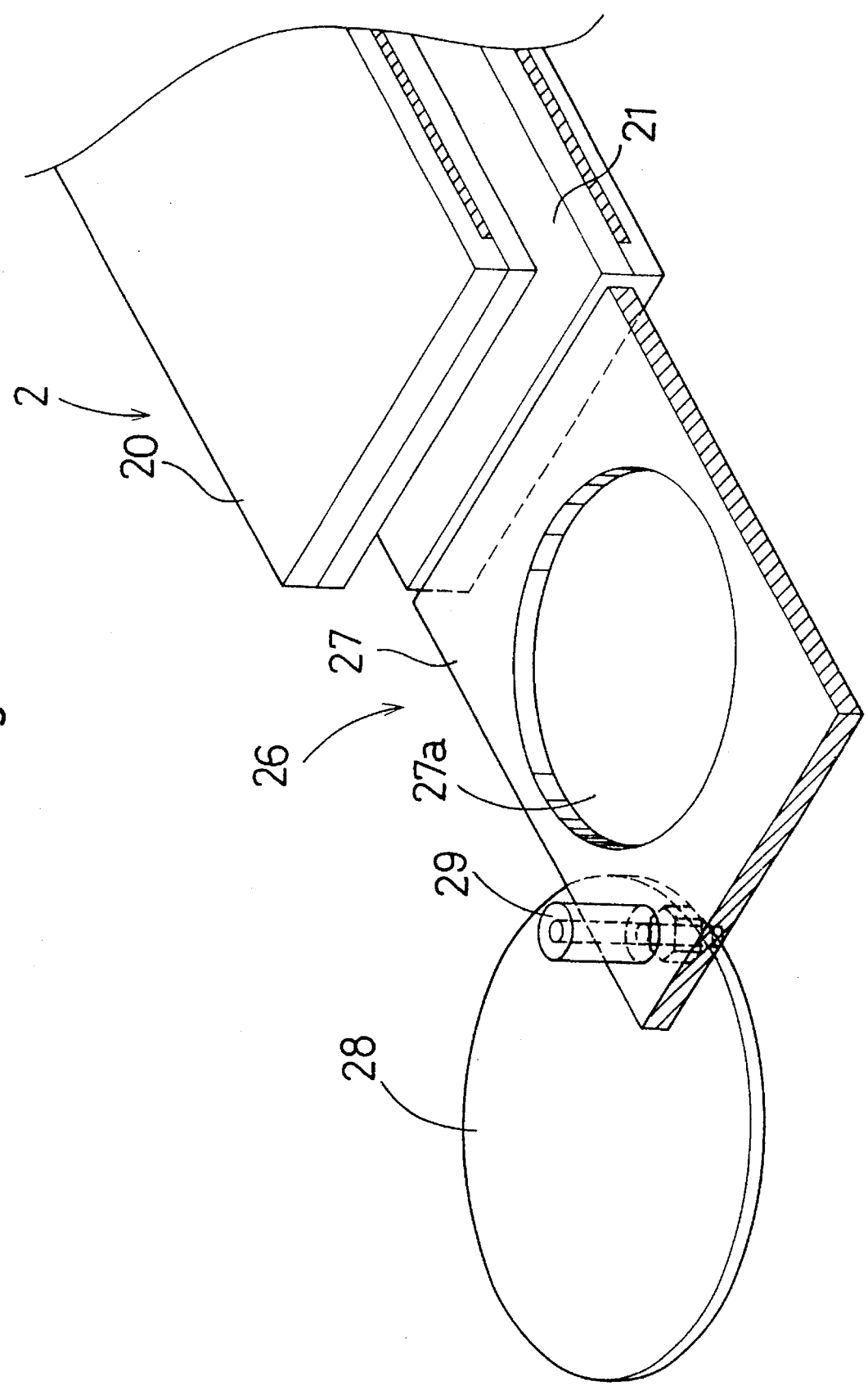
FIG. 12 is a perspective view of a patty receiver of the sandwich preparation apparatus according to the present invention.

Referring to FIG. 12, patty receiver 26 includes a plate member 27, a rotatable plate 28, and an actuator 29. Plate member 27 has a hole 27a therein. Actuator 29 rotates rotatable plate 28 under plate member 27 to cover and uncover hole 27a. When patty P is moved onto patty receiver 26, the bottom of hole 27a is blocked by rotatable plate 28, whereby patty P comes to rest in hole 27a, supported by rotatable plate 28. Rotatable plate 28 is rotated away from plate member 27 to uncover hole 27a and allow patty P to drop through hole 27a onto heel H on conveying dish U which is held at position P5 by stopper S1. The placement of patty P onto heel H is detected by a sensor which may be, for example, an optical sensor or a weight sensor (not shown), thereby releasing stopper S1 and permitting the unfinished sandwich to move downstream. A sensor (not shown) determines that conveying dish U, with heel H and patty P aboard, has been moved out of the way, then returns stopper S1 to its stopped state after conveying dish U moves away.

Manual preparation Section TS

Referring to FIGS. 1 and 2, manual preparation section TS is located between automatic patty preparation section PS and automatic crown preparation section CS. Manual preparation section TS is used for an operator OP to add manually any additional food materials to an unfinished sandwich. At this stage, an unfinished sandwich consists of either a toasted heel H or a patty P on a toasted heel H. Conveying dish U with the unfinished sandwich is stopped in this section by stopper S2 at position P7. Operator OP then adds any required food materials, such as sauces and seasonings (hamburger sauce, mayonnaise, teriyaki sauce, tartar sauce, mustard, and ketchup), vegetables (onion, lettuce, and pickles), and various items such as cheese, fried fish fillet, chicken filet, and croquette.

Figure 9:
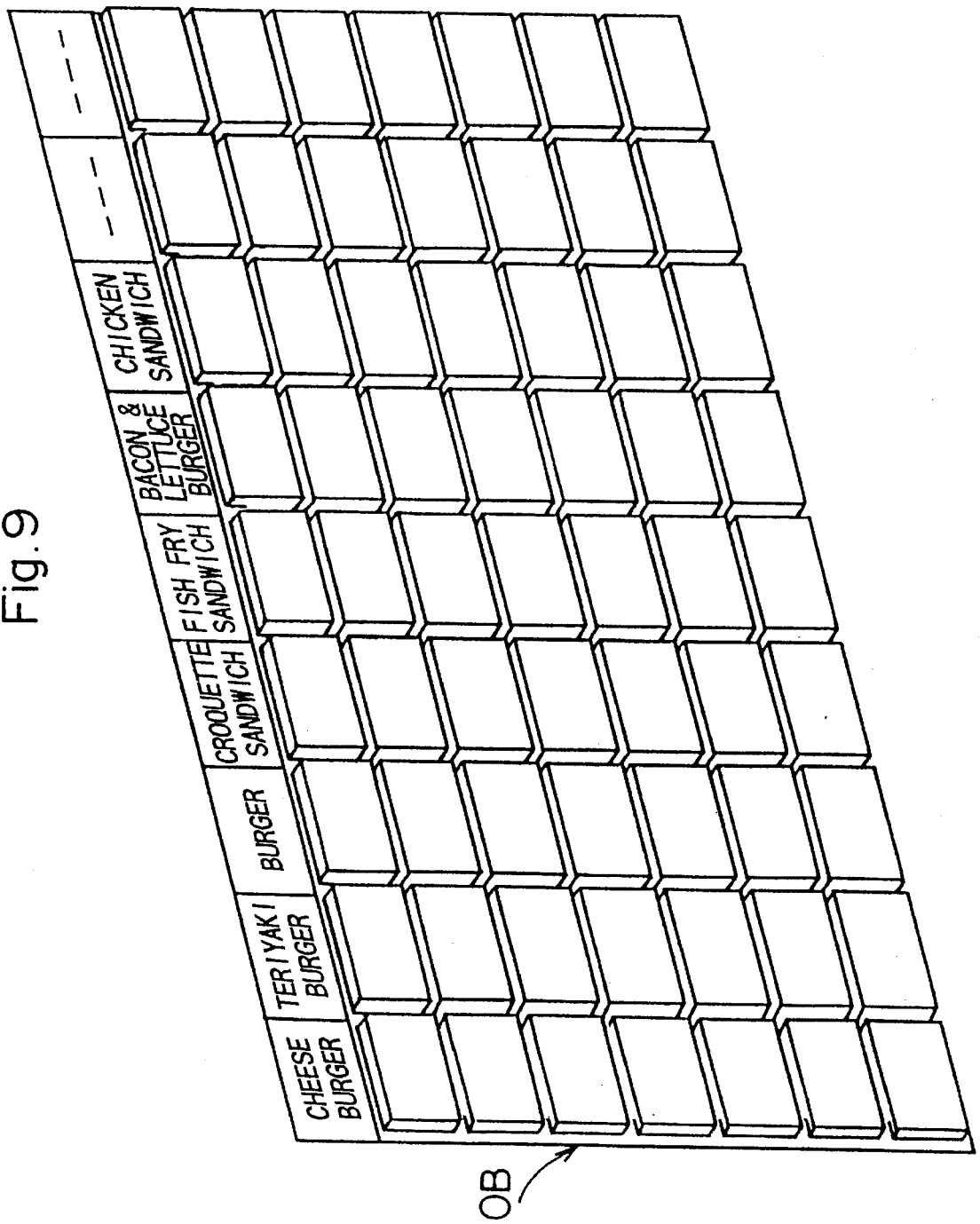
FIG. 9 is a perspective view of an order board of the sandwich preparation apparatus according to the present invention.
Figure 10:
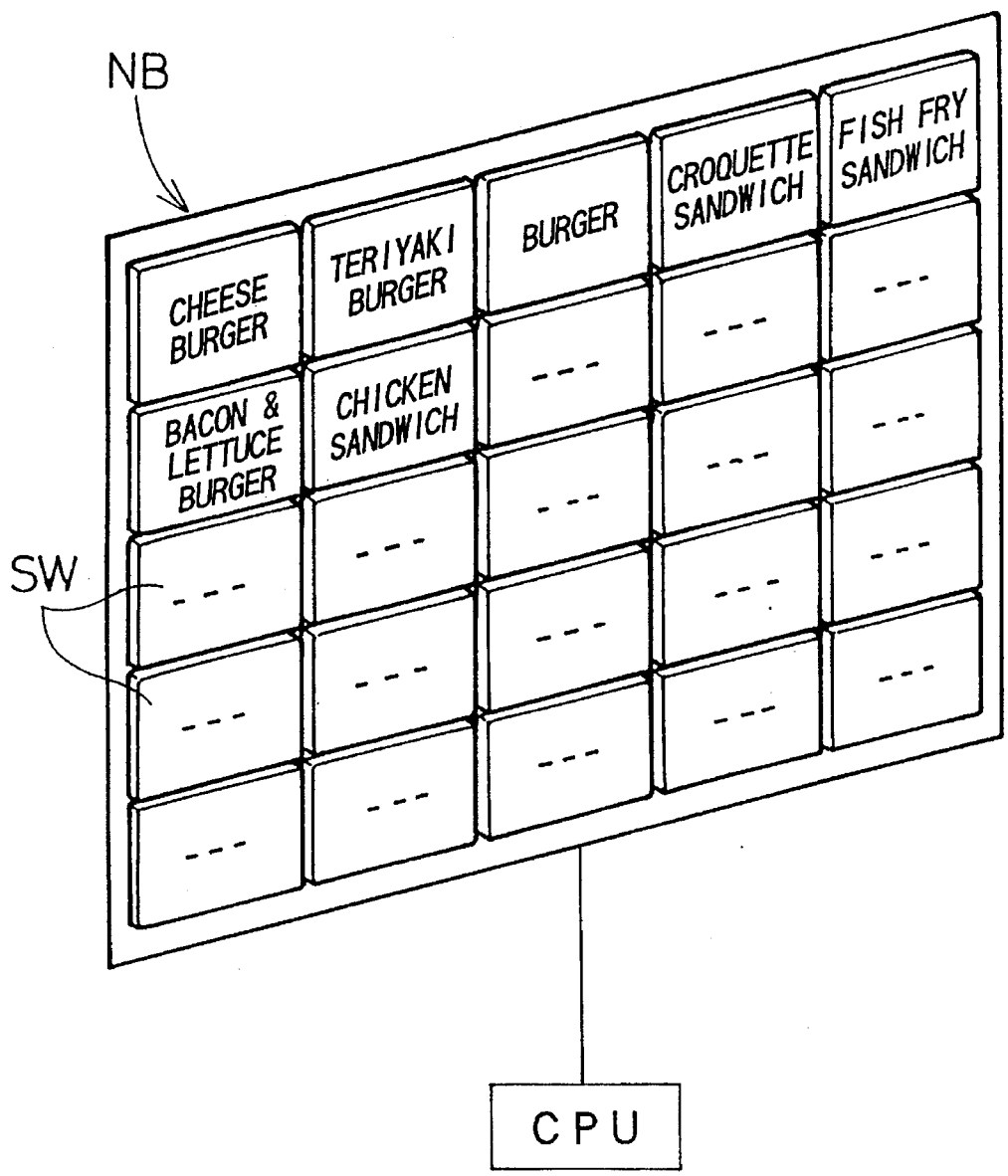
FIG. 10 is a perspective view of an interface board of the sandwich preparation apparatus according to the present invention.

Referring to FIGS. 9–10, an order board OB is positioned where it is easily seen by operator OP working at manual preparation section TS. An interface board NB, positioned within easy reach of operator OP, has keys corresponding to all foods available. As operator OP finishes manually adding any required food materials to the unfinished sandwich, operator OP presses a key SW on interface board NB corresponding to the item completed. As a result, stopper S2 is released, thereby allowing the unfinished sandwich on its conveying plate U to continue downstream to automatic crown preparation section CS. In addition, switching LED's on order board OB are extinguished, and automatic crown preparation section CS is actuated.

Automatic crown preparation section CS

Figure 13:
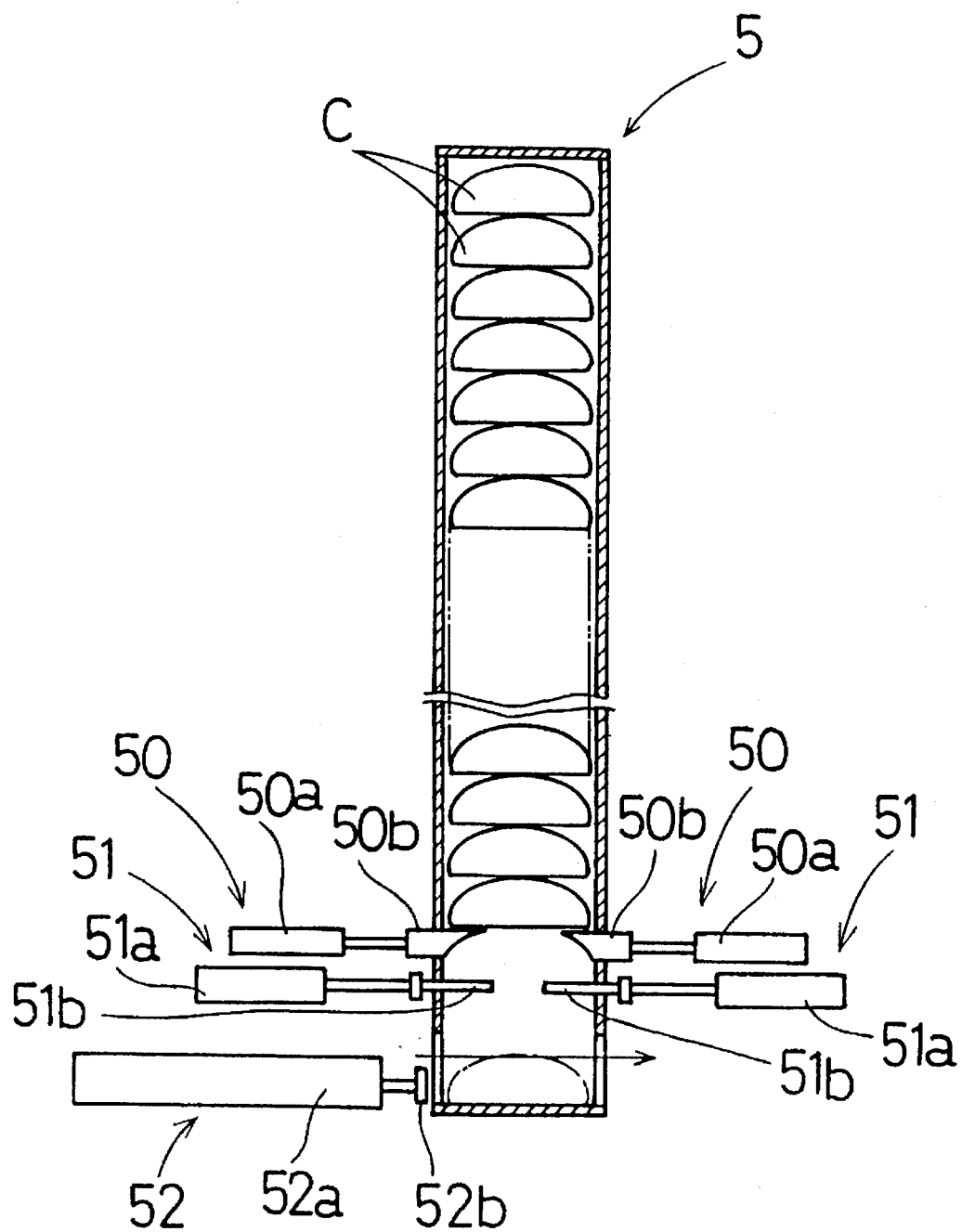
FIG. 13 is a section view of a crown stocker of the sandwich preparation apparatus of FIG. 1.

Referring to FIGS. 1, 2, and 13, automatic crown preparation section CS discharges a plurality of crowns C one at a time from a crown stocker 5. Each crown C is then toasted by a crown toasting device 6. Crown stocker 5 is shaped as a substantially rectangular parallelepiped. Crown stocker 5 includes a pair of upper stoppers 50, a pair of lower stoppers 51, and a pushing device 52. Pushing device 52 pushes and shifts crown C at a bottom of crown stocker 5 from a position P8 to a position P9 at crown toasting device 6.

Upper stoppers 50 each include a cylinder 50a and a holding member 50b affixed to an output shaft of cylinder 50a. Each lower stopper 51 includes a cylinder 51a and a holding member 51b affixed to an output shaft of cylinder 51a. Pushing device 52 includes a cylinder 52a and a pushing member 52b affixed to an output shaft of cylinder 52a. Cylinders 50a, 51a, and 52a cooperate as follows.

As depicted in FIG. 13, holding members 50b of cylinders 50a move apart. A bottom crown C of a stack of crowns is moved downward by gravity, until it is caught by holding members 51b of lower stoppers 51. Holding members 51b are in an extended state at this point, while holding members 50b are retracted.

Next, holding members 50b extend toward each other. Bottom crown C is now between holding members 51b and holding members 50b. A crown C immediately above bottom crown C is kept from falling by holding members 50b.

Then holding members 51b retract, thereby dropping bottom crown C onto a bottom of crown stocker 5. After bottom crown C drops, holding members 51b extend again. Pushing device 52 then pushes bottom crown C from position P8 to position P9 inside crown toasting device 6. Repeating these steps allows the crowns C stacked in crown stocker 5 to be sequentially toasted in crown toasting device 6.

Figure 14:
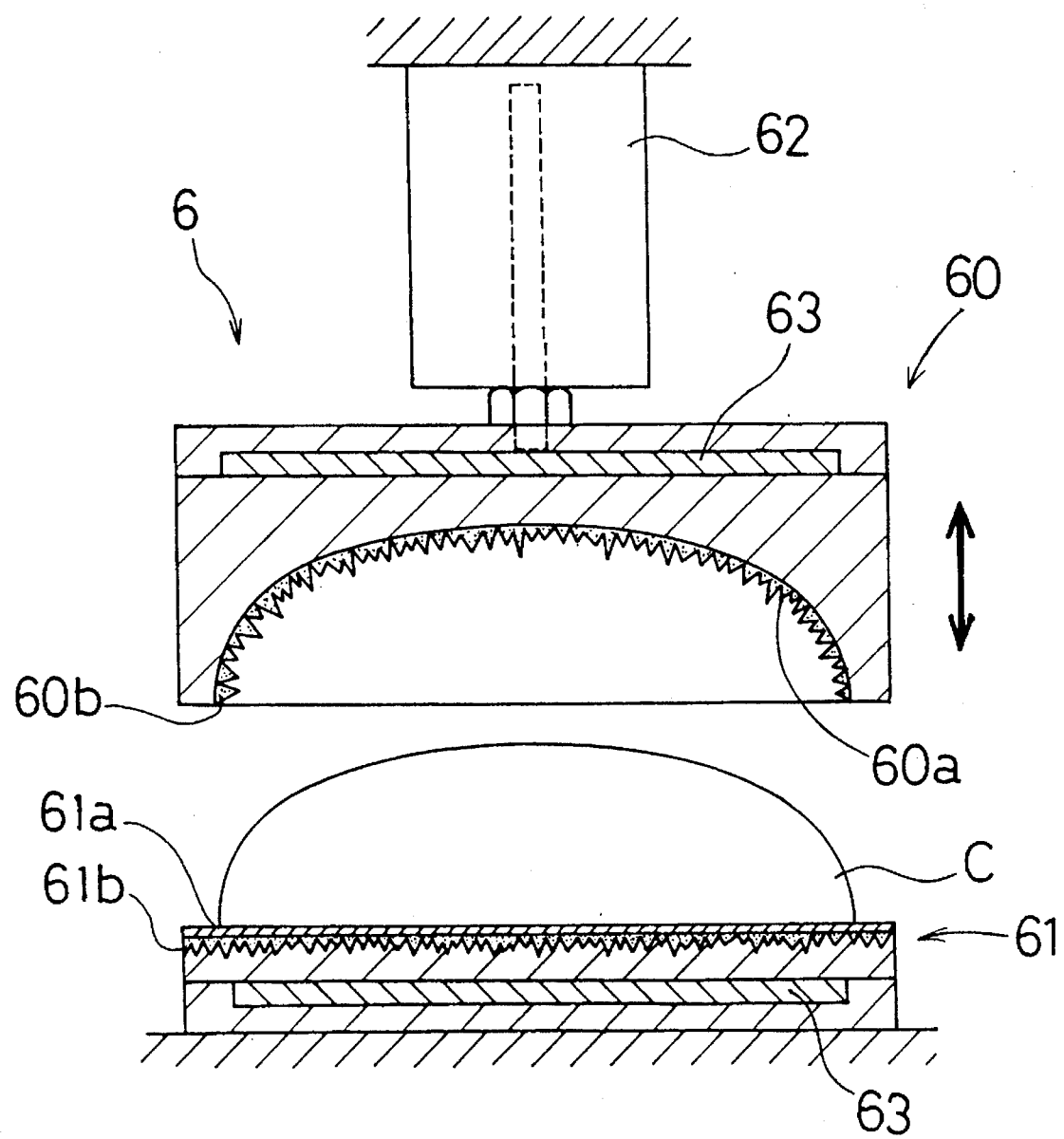
FIG. 14 is a partial section view of a crown toasting device according to the present invention.

Referring to FIGS. 1, 2, and 14, crown toasting device 6 toasts crown C by heating and slightly pressing it between a pair of substantially parallel upper and lower heating plates 60, 61 disposed vertically. Upper heating plate 60 is moved up and down by a cylinder 62. A recess portion 60a in a bottom of upper heating plate 60 substantially conforms to a hemispherical shape of an upper side of crown C. A flat face 61a on a top surface of lower heating plate 61 opposes recess portion 60a. Upper and lower heating plates 60, 61 each include upper and lower metal plates with a heater 63 inserted therebetween.

A layer 60b on recess portion 60a is a far infrared radiation substance such as alumina $Al_2O_3$. Flat face 61a has a layer 61b on its surface. Since flat face 61a contacts a cut side of crown C, it is particularly desirable that layer 61b be a combination of the far infrared radiation substance and an adherent substance such as, for example, silicon or a polytetrafluoroethylene (PTFE) such as is sold under the registered trademark "TEFLON."

Crown C, after being toasted by crown toasting device 6, is shifted from position P9 to a crown falling port h' by a pusher 64. Pusher 64 conventionally includes a cylinder, a torque actuator, and an arm. An unfinished sandwich moving downstream is positioned on conveyor belt 8 under crown falling port h' by stopper S3. A sensor (not shown), upon detecting that crown C is on the now completed sandwich, releases stopper S3. Conveyor belt 8 moves conveying dish U and the completed sandwich downstream to wrapping section LS. A sensor (not shown) detects the arrival of conveying dish U at wrapping section LS and resets stopper S3 in its original position.

Wrapping section LS

Referring to FIGS. 1 and 2, wrapping section LS is at an extreme downstream end, position P11, of conveyor belt 8. Completed sandwiches reaching wrapping section LS are wrapped in a protective covering or placed in a protective bag or box. Wrapping is accomplished manually or by using conventional automatic wrapping techniques.

Cooperation of order board OB, interface board NB, and each preparation section

Operator OP, or a counter person who takes orders at a counter, operates the sandwich preparation apparatus of the present invention. Operator OP, or the counter person, inputs a customer's order on an entry display device (not shown), causing a switching LED of order board OB corresponding to the ordered sandwich to light up. Simultaneously, automatic heel preparation section HS and automatic patty preparation section PS are actuated if the order calls for a patty. Otherwise, only automatic heel preparation section HS is actuated.

As operator OP finishes the manual preparation stage of an ordered sandwich, operator OP presses the appropriate key on interface board NB, causing the corresponding switching LED on order board OB to go off and actuating automatic crown preparation section CS.

Thus, the sandwich preparation apparatus of this embodiment facilitates the production of a variety of hamburgers and sandwiches, such as regular hamburgers, teriyaki burgers, cheese burgers, fish sandwiches, chicken sandwiches, and the like. A regular hamburger or sandwich bun has a diameter of about 10 cm, thereby permitting a width of each sandwich production line to be in a range of 1–8 cm greater than 10 cm, or 11–18 cm. A width of about 15 cm is preferable. Accordingly, a number of parallel adjacent sandwich production lines do not require a great width. When one sandwich production line HL is made about 15 cm in width and the apparatus has four such lines, the width of the apparatus as a whole measures only about 60 cm. Such a small apparatus is easily installed in a conventional, relatively small kitchen. Nevertheless, heightened productivity is obtained because four sandwiches can be produced simultaneously by four sandwich production lines HL.

The sandwich preparation apparatus described above is designed for one operator OP and provided with only four sandwich production lines HL so that operator OP is able to reach each of the lines. Using two operators OP working on both sides of the apparatus, the apparatus easily includes eight sandwich production lines HL.

Figure 15:
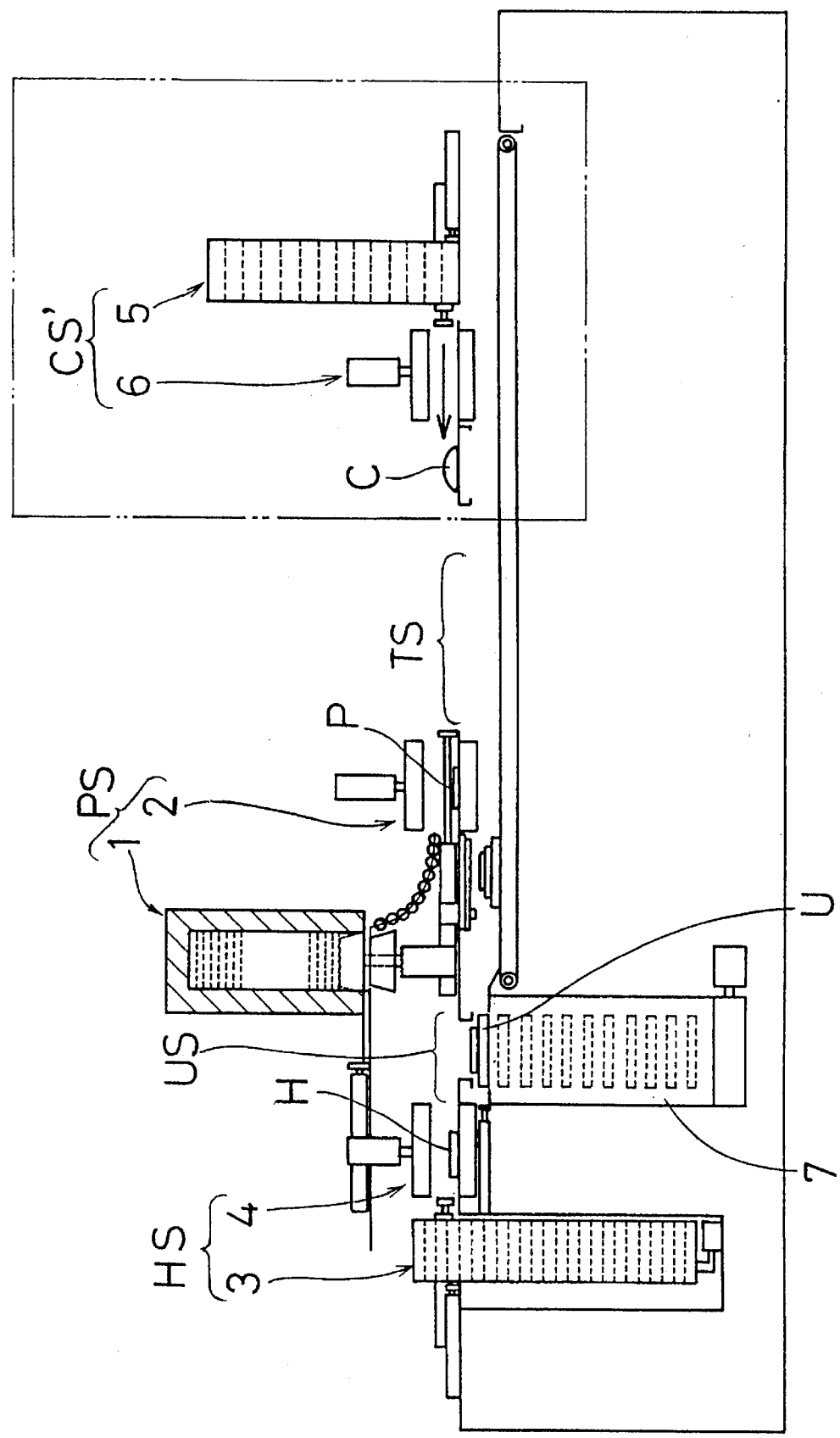
FIG. 15 is a front view of a sandwich preparation apparatus in which an automatic crown preparation section is oriented toward a manual preparation section.

Referring to FIG. 15, a flow of an automatic crown preparation section CS' of sandwich preparation apparatus SA described above can be reversed as illustrated. The output of automatic crown preparation apparatus CS' is oriented toward manual preparation section TS instead of toward wrapping section LS. This reversal allows all food materials to flow toward manual preparation section TS where they are easily monitored by operator OP. In order to implement this arrangement easily, each automatic preparation section is made as one independent unit.

Figure 16:
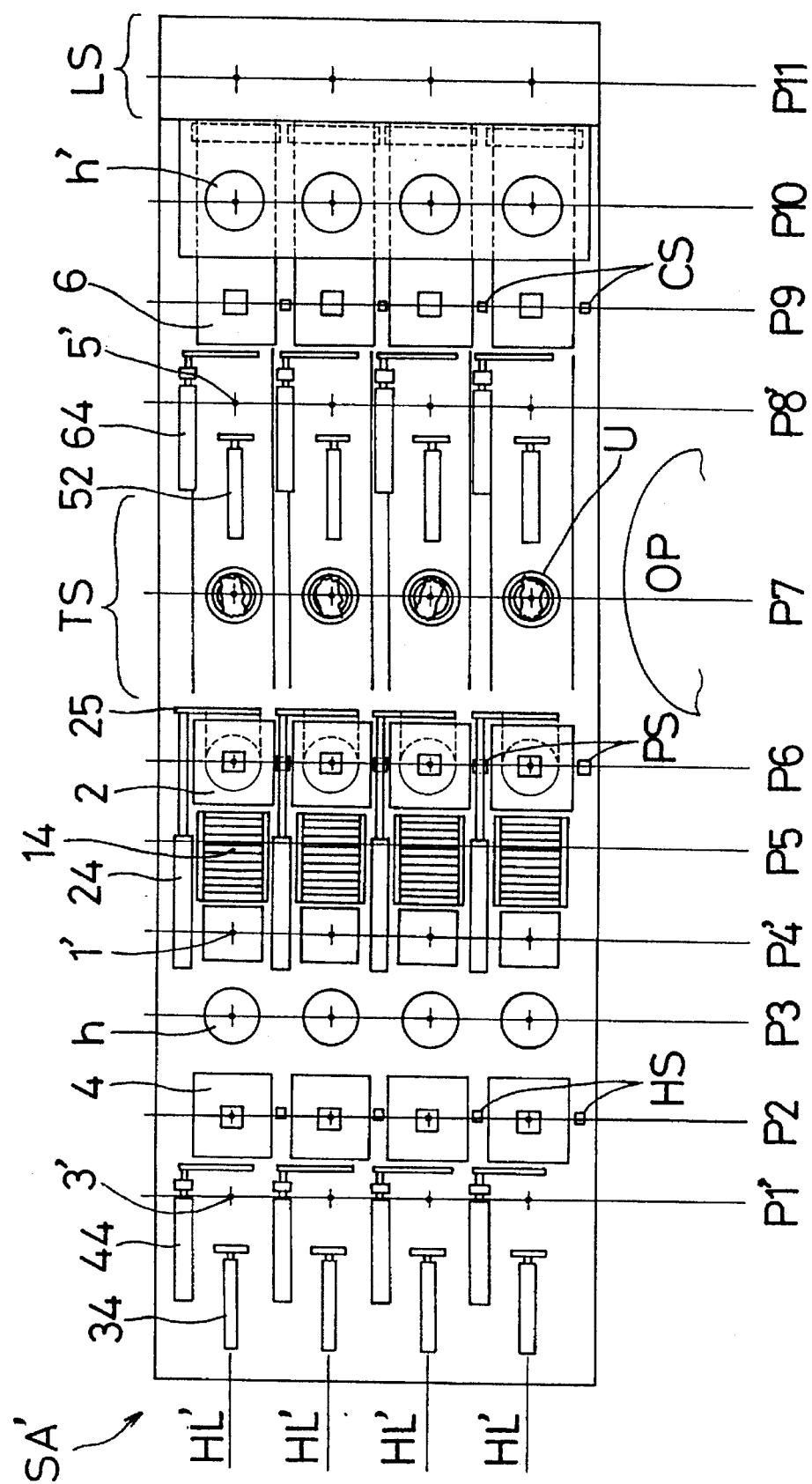
FIG. 16 is a plan view of another embodiment of a sandwich preparation apparatus according to the present invention.
Figure 17:
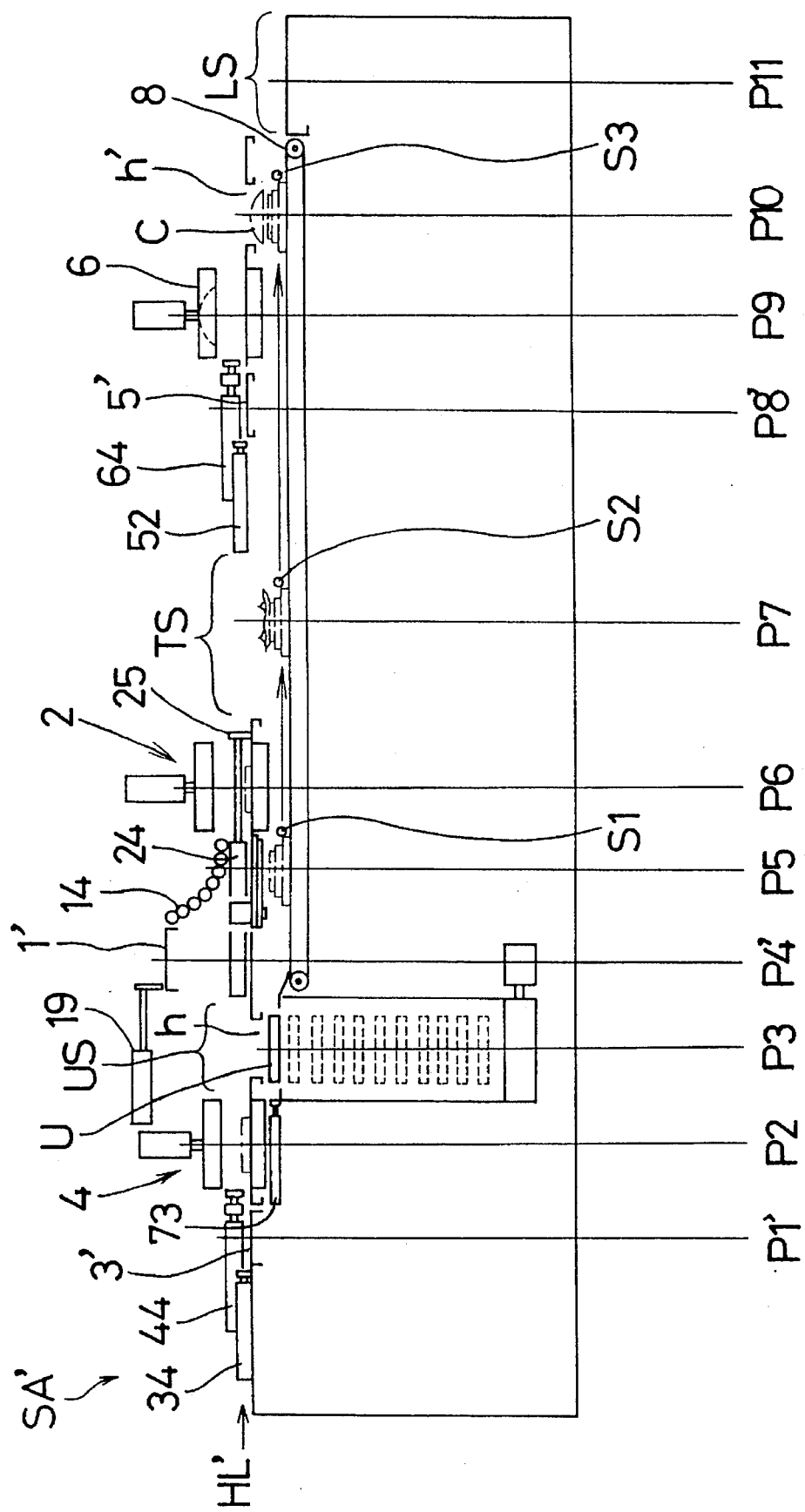
FIG. 17 is a front view of the sandwich preparation apparatus of FIG. 16.
Figure 18:
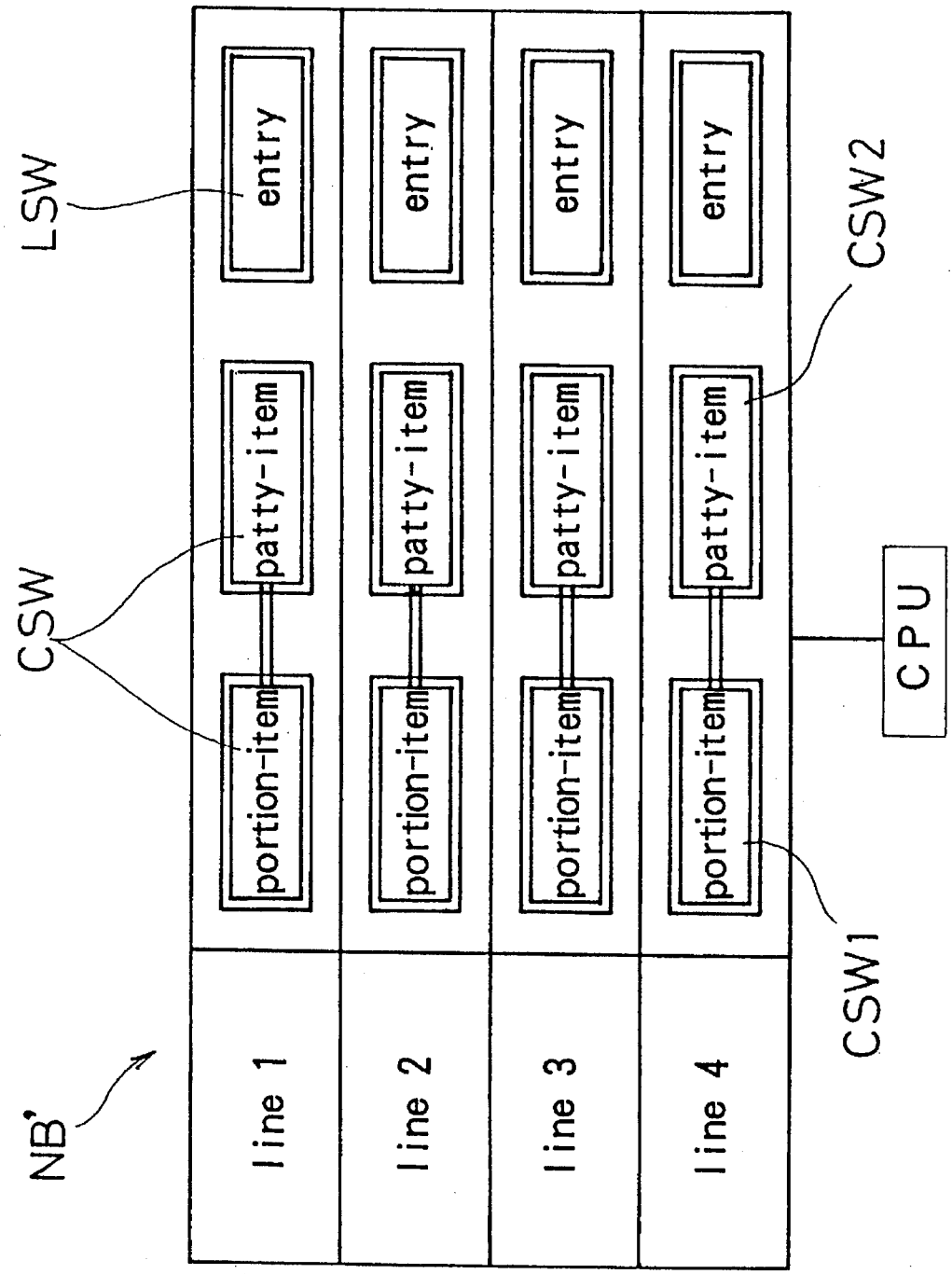
FIG. 18 is a front view of an operation board of the sandwich preparation apparatus of FIG. 16.

Referring to FIGS. 16–18, a second embodiment is a simplified version of the first embodiment described above. Patty stocker 1, heel stocker 3, and crown stocker 5 are not used in a sandwich preparation apparatus SA' in the second embodiment. Instead, these functions are performed manually by operator OP as follows. A patty adding section 1' permits operator OP to add patty P at a position P4'. A heel adding section 3' permits operator OP to add heel H at a position P1'. A crown adding section 5' permits operator OP to add crown C at a position P8'.

Because of the structural differences between the first and second embodiments, the system flow and the input procedure of operator OP are simplified. Operator OP simply presses an appropriate selection switch CSW and a corresponding actuating switch LSW on an operation board NB' as depicted in FIG. 18. Each production line HL has its corresponding selection switches CSW and actuating switch LSW. For reference purposes, an item requiring a patty P is referred to as a "patty-item" and an item not requiring a patty, such as french fries, croquettes, fried fish filet, and chicken filet, is referred to as a "portion-item." A selection switch CSW1 selects a portion-item while a selection switch CSW2 selects a patty-item. Before pressing actuating switch LSW, operator OP places heel H, crown C, and patty P, if required, at positions P1', P8', and P4', respectively. Pressing actuating switch LSW activates sandwich preparation apparatus SA'.

Although there are four sandwich production lines HL', each line functions in the same manner. Several kinds of sandwiches are prepared on one line. For example, first, second, and third sandwiches, a patty-item, a portion-item, and a second patty-item, are produced as follows.

(1) Operator OP presses selection switch CSW2, selection switch CSW1, and selection switch CSW2 in that order. A CPU (not shown) stores this sequence in memory.

(2) Operator OP places one patty P on patty adding section 1' at position P4', one heel H on heel adding section 3' at position PI', and one crown C on crown adding section 5' at position P8'.

(3) Operator OP presses actuating switch LSW. A pusher 19 is actuated and pushes patty P to a patty grilling device 2. At the same time, a pusher 34 pushes heel H to a heel toasting device 4 and a pusher 52 pushes crown C to a crown toasting device 6. Operator OP then places another patty, heel, and crown in their respective adding sections. Patty grilling device 2, heel toasting device 4, and crown toasting device 6 each contain a sensor (not shown) which detects a presence of an item and begins the respective operations of grilling and toasting.

(4) When each operation is completed, the following takes place.

(a) A pusher 44 pushes toasted heel H to a position P3 where it drops onto a conveying dish U through a heel receiving port h.

(b) A pusher 73 pushes conveying dish U along with heel H to a position P5 where it is stopped by a stopper S1.

(c) An arm 25 shifts grilled patty P to position P5 where it drops onto heel H on conveying dish U.

(d) Stopper S 1 is released, thereby allowing conveying dish U to proceed downstream until it is stopped at a position P7 by a stopper S2.

(e) Operator OP adds any additional required food materials while conveying dish U is stopped at position P7.

(f) Stopper S2 is released, thereby allowing conveying dish U to continue downstream until it is stopped at a position P10 by a stopper S3.

(g) A pusher 64 pushes toasted crown C to a crown falling port h' where it drops onto the unfinished sandwich at position P10, thus completing the first sandwich.

(h) Stopper S3 is released, allowing the completed first sandwich to move downstream for wrapping to a wrapping section LS at a position P11.

(5) Subsequent toasting and grilling operations begin as soon as physically possible. When stopper S1 is released, the next heel H, which operator OP placed on heel adding section 3' as described in step (3) above, is automatically moved to heel toasting device 4 for toasting. When stopper S3 is released, the next crown C, which operator OP placed on crown adding section 5' as described in step (3) above, is automatically moved to crown toasting device 6 for toasting. The next patty P, which operator OP placed on patty adding section 1' as described in step (3) above, does not move. Since in step (1), pressing selection switch CSW1 after selection switch CSW2 signalled the CPU that the second sandwich is a portion-item, patty P is not required. If the second sandwich were a patty-item, patty P would be sent to patty grilling device 2 at this point.

As soon as heel H and crown C are pushed into their respective toasting devices, operator OP places another heel H and crown C in their respective starting locations.

(6) The second sandwich is completed as follows.

(a) Toasted heel H is moved from heel toasting device 4 on top of conveying dish U at position P3.

(b) Conveying dish U moves downstream. The CPU has kept stopper S1 in a released position since the second sandwich is a portion-item and does not require a patty P at position PS. Conveying dish U moves downstream until it is stopped at position P7 by stopper S2.

(c) The second sandwich is completed following steps 4(e) through 4(h) described above.

(7) The third sandwich is completed in substantially the same way as the second. Since the third sandwich requires patty P, the patty P that operator OP placed on patty adding section 1' as described in step (3) above is sent to patty grilling device 2 for grilling. Heel H and crown C are sent to their respective toasting devices for toasting.

(8) The third sandwich is completed in the same manner as the first sandwich.

The output flow of automatic crown preparation section CS can be reversed as previously described with reference to FIG. 15. The output of automatic crown preparation apparatus CS is oriented toward manual preparation section TS instead of toward wrapping section LS. This reversal allows all food materials to flow toward manual preparation section TS where they are easily monitored by operator OP.

The second embodiment includes patty adding section 1', heel adding section 3', and crown adding section 5' instead of patty stocker 1, heel stocker 3, and crown stocker 5 included in the first embodiment. These adding sections are optional, and a third embodiment (not shown) is the same as the second embodiment but without these sections. Operator OP places heel H, crown C, and patty P directly in their respective toasting and grilling devices.

The above description presumes that a generally circular bun, having a substantially flat heel and rounded crown, will be the basis for a sandwich. In addition, as described, the heel is assembled at the bottom of the sandwich and the sandwich is topped by the crown. The present invention should not be taken as limited by such geometry. For example, it is within the contemplation of the present invention that a sandwich may be made of two heels, two crowns, or of a material that does not resemble a bun such as, for example, two slices of bread having a round, oval or square perimeter. When a bun is used, the positions of the heel and crown may be reversed, thereby placing the crown on the bottom, and the heel on top, without departing from the spirit and scope of the invention.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A sandwich preparation apparatus, comprising:

at least first and second sandwich production lines;

said at least first and second sandwich production lines including means for producing a sandwich;

said sandwich including at least a heel, a crown, and an item therebetween;

said at least first and second sandwich production lines being parallel to each other;

said at least first and second sandwich production lines having a width slightly greater than a width of said sandwich; and said at least first and second sandwich production lines having means for toasting said heel, means for toasting said crown, and means for permitting adding said item to complete said sandwich.

2. A sandwich preparation apparatus according to claim 1, further comprising means for heating said item.

3. A sandwich preparation apparatus according to claim 1, further comprising means for permitting manual addition of a food material to said sandwich.

4. A sandwich preparation apparatus according to claim 1, wherein said means for toasting said heel comprises:

means for storing said heel;

an automatic heel toasting device; and means for supplying said heel from said means for storing said heel to said automatic heel toasting device.

5. A sandwich preparation apparatus according to claim 1, wherein said means for toasting said crown comprises:

means for storing said crown;

an automatic crown toasting device; and means for supplying said crown from said means for storing said crown to said automatic crown toasting device for toasting.

6. A sandwich preparation apparatus according to claim 2, wherein said means for heating said item comprises:

means for storing said item;

an automatic item grilling device; and means for supplying said item from said means for storing said item to said automatic item grilling device for grilling.

7. A sandwich preparation apparatus according to claim 1, wherein said at least first and second sandwich production lines are substantially straight.

8. A sandwich preparation apparatus according to claim 1, wherein said width of each of said at least first and second sandwich production lines is 1–8 cm greater than said width of said sandwich.

9. A sandwich preparation apparatus according to claim 1, wherein said means for toasting said heel comprises:

an automatic heel toasting device; and means for manually adding said heel to said automatic heel toasting device for toasting.

10. A sandwich preparation apparatus according to claim 1, wherein said means for toasting said crown comprises:

an automatic crown toasting device; and means for manually adding said crown to said automatic crown toasting device for toasting.

11. A sandwich preparation apparatus according to claim 2, wherein said means for grilling said item comprises:

an automatic item grilling device; and means for manually adding said item to said automatic item grilling device for grilling.

12. A sandwich preparation apparatus, comprising:

at least one sandwich production line;

said at least one sandwich production line effective for preparing at least one type of sandwich;

said at least one sandwich production line including a conveyor belt;

a conveying dish supply device for feeding a conveying dish onto said conveyor belt;

a heel stocker for stocking an untoasted heel;

a heel toasting device for toasting said untoasted heel, thereby producing a toasted heel;

a heel pusher for moving said untoasted heel from said heel stocker to said heel toasting device;

means for moving said toasted heel to said conveying dish;

a patty stocker for stocking an uncooked patty;

a patty grilling device for grilling said uncooked patty, thereby producing a grilled patty;

a roller conveyor extending from said patty stocker to said patty grilling device;

an arm for moving said uncooked patty from said patty stocker to said roller conveyor;

means for moving said grilled patty to a patty holding area;

means for moving said grilled patty from said patty holding area to said toasted heel on said conveying dish;

a crown stocker for stocking an untoasted crown;

a crown toasting device for toasting said untoasted crown, thereby producing a toasted crown;

an upper heating plate of said crown toasting device having a recessed portion substantially conforming to a shape of an upper side of said crown;

a crown pusher for moving said untoasted crown from said crown stocker to said crown toasting device;

means for moving said toasted crown onto said grilled patty on said toasted heel on said conveying dish;

an interface board;

a CPU;

at least one key on said interface board acting as an input to said CPU;

said at least one key corresponding to said at least one type of sandwich; and means, responsive to said input, whereby said CPU controls at least one of said conveying dish supply device, said heel stocker, said heel pusher, said heel toasting device, said means for moving said toasted heel to said conveying dish, said patty stocker, said arm, said patty grilling device, said means for moving said grilled patty to said patty holding area, said means for moving said grilled patty from said patty holding area to said toasted heel on said conveying dish, said crown stocker, said crown pusher, said crown toasting device, and said means for moving said toasted crown onto said grilled patty on said toasted heel on said conveying dish.

13. A sandwich preparation apparatus, comprising:

at least one sandwich production line;

said at least one sandwich production line effective for preparing at least one type of sandwich;

said at least one sandwich production line including a conveyor belt;

a conveying dish supply device for feeding a conveying dish onto said conveyor belt;

a heel toasting device for toasting an untoasted heel, thereby producing a toasted heel;

means for manually adding said untoaster heel to said heel toasting device;

means for moving said toasted heel to said conveying dish;

a patty grilling device for grilling an uncooked patty, thereby producing a grilled patty;

means for manually adding said uncooked patty to said patty grilling device;

means for moving said grilled patty to a patty holding area;

means for moving said grilled patty from said patty holding area to said toasted heel on said conveying dish;

a crown toasting device for toasting an untoasted crown, thereby producing a toasted crown;

an upper heating plate of said crown toasting device having a recessed portion substantially conforming to a shape of an upper side of said crown;

means for manually adding said untoasted crown to said crown toasting device;

means for moving said toasted crown onto said grilled patty on said toasted heel on said conveying dish;

an interface board;

a CPU;

at least one key on said interface board acting as an input to said CPU;

said at least one key corresponding to said at least one type of sandwich; and means, responsive to said input, whereby said CPU controls at least one of said conveying dish supply device, said heel toasting device, said means for moving said toasted heel to said conveying dish, said patty grilling device, said means for moving said grilled patty to said patty holding area, said means for moving said grilled patty from said patty holding area to said toasted heel on said conveying dish, said crown toasting device, and said means for moving said toasted crown onto said grilled patty on said toasted heel on said conveying dish.

* * * * *